2,854,455
4-(2-TRICHLOROSILYLETHYL)PYRIDINES

Francis E. Cislak, Indianapolis, Ind., assignor to Reilly Tar & Chemical Corporation, Indianapolis, Ind., a corporation of Indiana No Drawing. Application June 24, 1957
Serial No. 667,687

2 Claims. (Cl. 260—290)

This invention relates to a new composition of matter and to the process of making it. More particularly, it relates to 4-(2-trichlorosilylethyl)pyridines having the general formula:

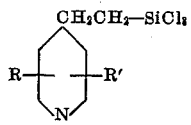

wherein R and R' are hydrogen or lower alkyl.

In general the trichlorosilylethylpyridines which are the subject of this invention may be prepared by the interaction of a 4-vinylpyridine and trichlorosilane. The equation below portrays the formation of 4-(2-trichlorosilylethyl)pyridine from 4-vinylpyridine and trichlorosilane:

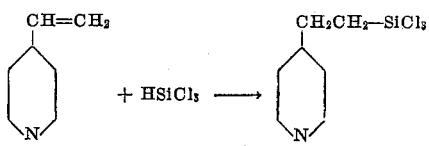

The manner in which my new compounds may be made is illustrated by the specific example given below.

EXAMPLE 1

*4-(2-trichlorosilylethyl)pyridine*

About 150 grams of 4-vinylpyridine is placed into a pressure vessel and then cooled to a temperature of about −20° C. To the cold 4-vinylpyridine there is added approximately 125 grams of trichlorosilane (SiHCl₃). Then the reaction vessel is closed. While stirring, the reaction mixture is gradually heated to an ultimate temperature of about 150° C. Then the mixture is cooled, and the 4-(2-trichlorosilylethyl)pyridine formed during the heating period is separated from the unchanged reactants in any convenient manner. One suitable way to recover the 4-(2-trichlorosilylethyl)pyridine is to subject the reaction mixture to fractional distillation under high vacuum. Any unchanged trichlorosilane is removed first, then the 4-vinylpyridine (which was in excess) is removed, and finally the 4-(2-trichlorosilylethyl)pyridine is distilled over.

The 4-(2-trichlorosilylethyl)pyridine of my invention is a tri-chlorosilane and as such it has the chemical properties associated with chlorosilanes and is capable of entering into the same type of reaction as other chlorosilanes, within the limitations imposed upon it by the pyridine nucleus.

My 4-(2-trichlorosilylethyl)pyridine may be hydrolysed by water to give a hydrochloric acid solution of 4-pyridylethylpolysiloxane. Hydrolysis with aqueous ammonia results in the precipitation of 4-pyridylethylpolysiloxane.

By the introduction of a minor proportion of 4-pyridylethyl group to methyl groups in a mixed polymer, a series of methyl, 4-pyridylethylsilicones may be obtained which are characterized by their high oxidation resistance as well as solubility in dilute acid solutions.

EXAMPLE 2

*2,6-dimethyl-4-(2-trichlorosilylethyl)pyridine*

The procedure of Example 1 is repeated with the exception that 2,6-dimethyl-4-vinylpyridine is used in place of the 4-vinylpyridine and 2,6-dimethyl-4-(2-trichlorosilylethyl)pyridine is recovered.

I claim as my invention:

1. 4-(2-trichlorosilylethyl)pyridines having the general formula:

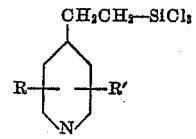

where R and R' are selected from the group consisting of hydrogen and lower alkyl.

2. The compound 4-(2-trichlorosilylethyl)pyridine.

No references cited.